United States Patent Office 3,799,932
Patented Mar. 26, 1974

---

3,799,932
GAMMA-PIPERIDINOBUTYROPHENONES
Hisao Yamamoto, Nishinomiya, Masaru Nakao and Kikuo Sasajima, Toyonaka, Isamu Maruyama, Minoo, and Shigenari Katayama, Takarazuka, Japan, assignors to Sumitomo Chemical Company, Limited, Osaka, Japan
No Drawing. Filed Mar. 15, 1971, Ser. No. 124,522
Claims priority, application Japan, Mar. 20, 1970, 45/23,724; May 22, 1970, 45/44,304; May 29, 1970, 45/46,669, 45/46,670; May 30, 1970, 45/46,970, 45/46,773; June 6, 1970, 45/48,930
Int. Cl. C07d 29/20
U.S. Cl. 260—293.6   6 Claims

ABSTRACT OF THE DISCLOSURE

A novel process for preparing central nervous system active butyrophenone derivatives in which γ-piperidinobutyrophenone derivatives of the formula

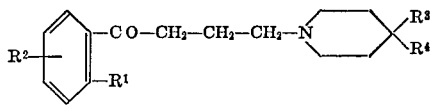

wherein $R^1$ is hydrogen, halogen, amino, acylamino, alkylamino or N-acylalkylamino; $R^2$ is hydrogen or halogen; $R^3$ is hydrogen or hydroxyl; and $R^4$ is a group having the formula,

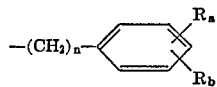

(wherein each of $R_a$ and $R_b$ is hydrogen, halogen, lower alkyl, lower alkoxy or trifluoromethyl; and $n$ is 1 or 2), or a group having the formula,

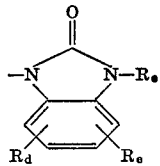

(wherein $R_c$ is hydrogen or lower alkyl; and each of $R_d$ and $R_e$ is hydrogen, halogen, lower alkyl or lower alkoxy), can be prepared by reacting an indole derivative of the formula,

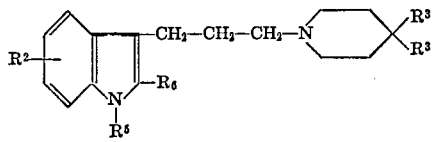

wherein $R^2$, $R^3$ and $R^4$ are the same as defined above, and $R^5$ and $R^6$ are hydrogen or alkyl having up to 4 carbon atoms respectively, with an oxidizing agent to yield an o-acylamino-γ-piperidinobutyrophenone derivative of the formula,

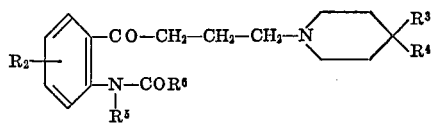

wherein $R^2$, $R^3$, $R^4$, $R^5$ and $R^6$ are the same as defined above, and further, if necessary, hydrolyzing the product to yield an o-amino-γ-piperidinobutyrophenone derivative of the formula,

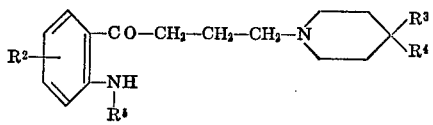

wherein $R^2$, $R^3$, $R^4$ and $R^5$ are the same as defined above, and further diazotizing, if desired, in case $R^5$ is hydrogen, the obtained o-amino-γ-piperidinobutyrophenone derivative and subsequently decomposing the resultant diazonium compound to replace the diazonium group by hydrogen or halogen. Among the butyrophenone derivatives thus obtained, those in which $R^1$ is halogen, amino, acylamino, alkylamino or N-acylalkylamino are novel compounds.

---

The present invention relates to a novel process for producing butyrophenone derivatives. More particularly the invention relates to a novel process for producing central nervous system active γ-piperidinobutyrophenone derivatives. The invention also pertains to novel central nervous system active γ-piperidinobutyrophenone derivatives and pharmaceutical use of the same.

The present inventors studied in order to find an advantageous process in which substituted γ-piperidinobutyrophenone derivative having a substituent at the ortho position can be produced. As a result, the present inventors found a novel and advantageous process for producing various substituted γ-piperidinobutyrophenone derivatives including such ortho-substituted compounds. The most important characteristic of the process of our finding resides in the production of o-acylamino-γ-piperidinobutyrophenone derivatives by the oxidation of 3-γ-piperidinopropylindole derivatives. The acylamino group of the thus obtained o-acylamino-γ-piperidinobutyrophenone derivatives can be converted to unsubstituted or substituted amino group by an ordinary hydrolysis reaction and further subsequently to hydrogen or halogen by an ordinary diazotization and decomposition. Therefore, according to the process of our finding, various γ-piperidinobutyrophenone derivatives can be produced very advantageously.

Accordingly, an object of the present invention is to provide a novel and advantageous process for producing γ-piperidinobutyrophenone derivatives.

Another object of the invention is to provide novel central nervous system active γ-piperidinobutyrophenone derivatives.

A further object of the invention is to provide a pharmaceutical use of such γ-piperidinobutyrophenone derivatives.

Other objects and merits of the invention will be apparent from the following description.

In order to accomplish these objects, the present invention provides a process for producing a γ-piperidinobutyrophenone compound of the formula,

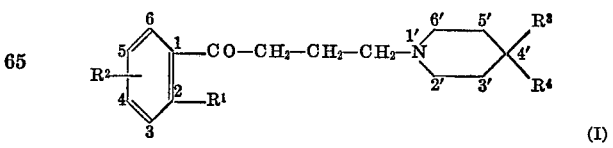

(I)

wherein $R^1$ is hydrogen, halogen, amino, acylamino, alkylamino or N-acylalkylamino, each of said alkyl group having up to 4 carbon atoms; $R^2$ is hydrogen or halogen; $R^3$ is hydrogen or hydroxyl; and $R^4$ is a group having the formula,

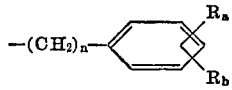

(wherein each of $R_a$ and $R_b$ is hydrogen, halogen, lower alkyl, lower alkoxy or trifluoromethyl; and $n$ is 1 or 2), or a group having the formula,

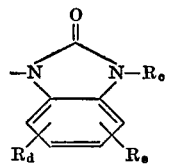

(wherein $R_c$ is hydrogen or lower alkyl; and each of $R_d$ and $R_e$ is hydrogen, halogen, lower alkyl or lower alkoxy), each of said alkyl and alkoxy group having up to 4 carbon atoms, or an acid addition salt thereof, which comprises contacting an indole compound of the formula,

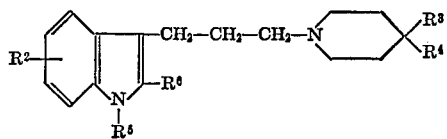

(IX)

wherein $R^5$ and $R^6$ each are hydrogen or alkyl having up to 4 carbon atoms respectively, and $R^2$, $R^3$ and $R^4$ are the same as defined above, with an oxidizing agent to yield a compound of the formula,

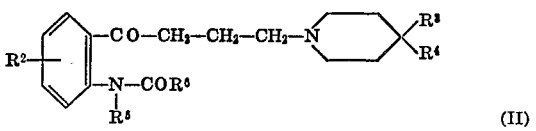

(II)

wherein $R^2$, $R^3$, $R^4$, $R^5$ and $R^6$ are the same as defined above, and if necessary, hydrolyzing the resulting compound of the Formula II to a compound of the formula,

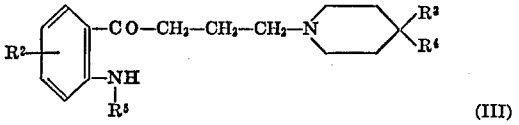

(III)

wherein $R^2$, $R^3$, $R^4$ and $R^5$ are the same as defined above, and further diazotizing, if desired, in case $R^5$ is hydrogen, the resulting compound of the Formula III and subsequently decomposing the resulting diazonium compound to replace the diazonium group by hydrogen or halogen to yield a compound of the formula,

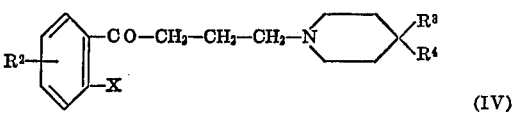

(IV)

wherein X is hydrogen or halogen; and $R^2$, $R^3$ and $R^4$ are the same as defined above.

According to the present invention, the objective compound of the Formula I can be prepared by the process as shown in the following synthetic schema:

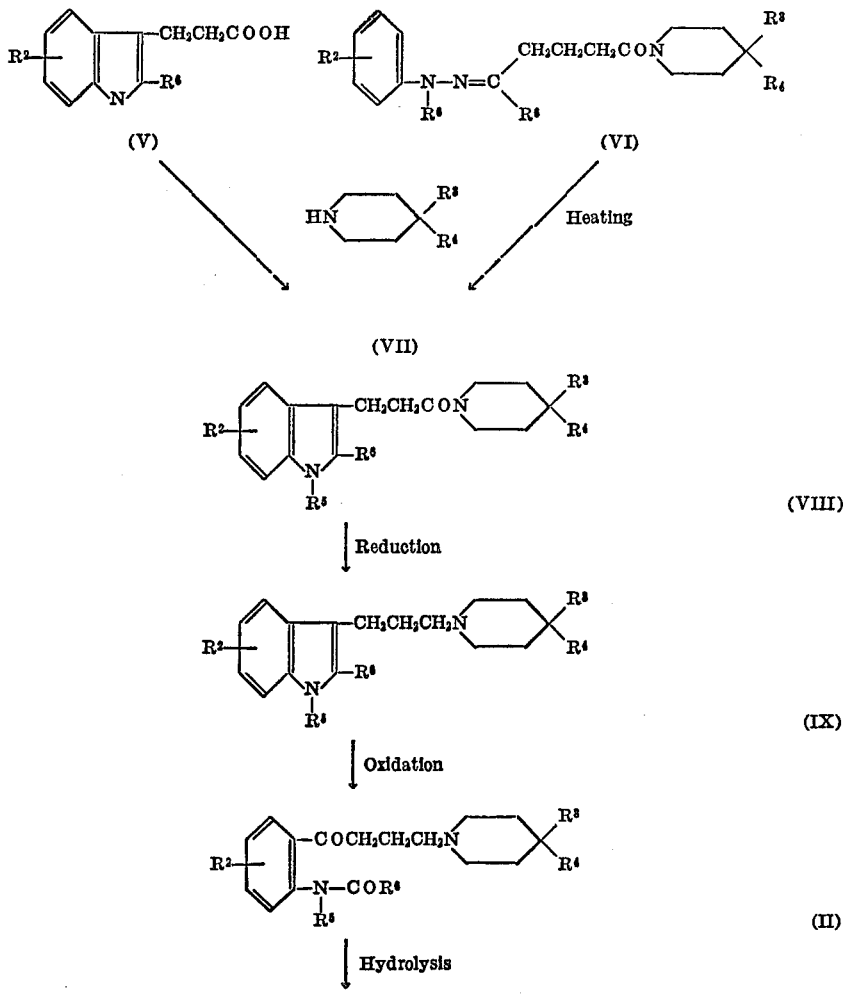

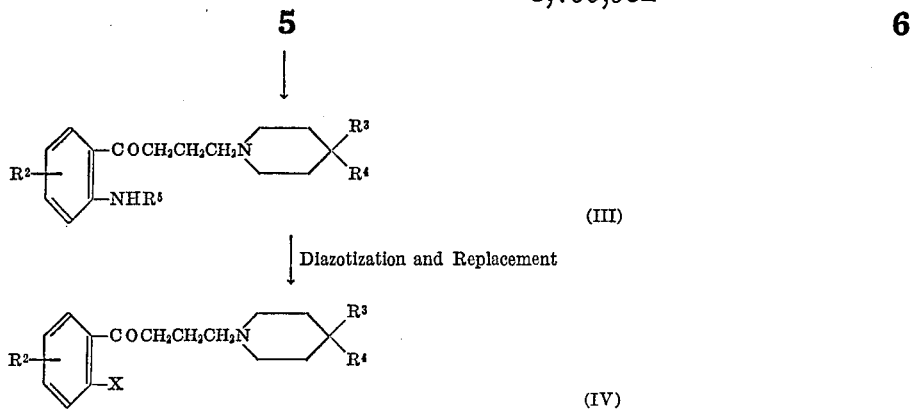

(III)

Diazotization and Replacement (IV)

wherein R², R³, R⁴, R⁵, R⁶ and X are as identified above.

The 1-[β-(3-indolyl)propionyl]piperidine compounds of the Formula VIII used as an intermediate in the present invention are prepared by reacting an indolylpropionic acid of the Formula V, or its functionally active derivative such as acid chloride, acid bromide, acid anhydride, mixed acid anhydride, p-nitrophenyl ester and the like, with a piperidine of the Formula VII. The reacton is preferably carried out in the presence of a basic agent or a condensing agent such as pyridine, triethylamine, sodium carbonate, sodium hydroxide, dicyclohexylcarbodiimide and the like in a suitable inert organic solvent such as tetrahydrofuran, ether, dioxane, benzene, toluene, chloroform, dimethylformamide and the like.

The mixed acid anhydride mentioned above includes those prepared by treating with ethyl chloroformate, isobutyl chloroformate or the like.

The intermediate compound of the Formula VIII can also be prepared by heating a phenylhydrazone compound of the Formula VI. The heating is carried out preferably in the presence of an acidic condensing agent such as, for example, hydrogen chloride, sulfuric acid, phosphoric acid, zinc chloride, copper chloride, boron fluoride, polyphosphoric acid and the like in a suitable solvent such as ethanol, isopropanol, tertiary-butanol, acetic acid, benzene, toluene, water and the like.

The compounds of the Formula VIII thus obtained are converted to corresponding 3-(γ-piperidinopropyl)indole compounds of the Formula IX by reacting the former with a reducing agent. A reducing agent such as alkali metal in alcoholic solvent, hydrogen in the presence of a catalyst, metal hydride and the like can be preferably employed. An electrolytic reduction can also be used for the purpose.

It is especially preferable to use metal hydride such as lithium aluminum hydride, diisobutyl aluminum hydride, triisopropyl aluminum hydride, boron hydride or the like, in an inert organic solvent such as, for example, ether, tetrahydrofuran, dioxane, N-ethylmorphorine and the like.

After the reaction is complete, the excess of reducing agent present and the complex compound thereof formed are decomposed by addition of water, an alcohol, ethyl acetate or the like, and then the objective Compound IX can be isolated or, if necessary, further purified by recrystallization, etc. If desired, the product can be converted into an acid addition salt thereof by treating with a mineral or organic acid. The said salt can be formed with, for example, hydrochloric, sulfuric, phosphoric, hydrobromic, thiocyanic, acetic, propionic, oxalic, citric, malic, tartaric, fumaric, maleic, succinic, glycolic, benzoic, cinnamic, p-aminosalicylic, salicylic, methanesulfonic, ascorbic acids, etc.

γ-Piperidinobutyrophenones of the Formula II can be prepared by contacting the above-obtained 3-γ-piperidinopropylindoles of the Formula IX or an acid addition salt thereof with an oxidizing agent. In the oxidative cleavage reaction, it is preferred to use an oxidizing agent such as ozone, hydrogen peroxide, performic acid, peracetic acid, perbenzoic acid, chromic acid or potassium permanganate, although the oxidizing agent of the present invention is not limited to the exemplified ones and others may be used.

Generally, the reaction progresses readily at room temperature, but the temperature may be higher or lower as necessary to effect the desired control of the reaction. The oxidizing agent is preferably chromic acid or ozone. The reaction is preferably effected in the presence of a solvent. The choice of solvent depends on the oxidizing agent employed, and is selected from the group consisting of water, acetone, carbon tetrachloride, acetic acid, sulfuric acid and the like. The oxidizing agent is used in the stoichiometric amount or more. The reaction temperature varies depending on the oxidizing agent employed.

Where the oxidation is carried out by use of chromic acid in the presence of acetic acid, it is preferable that the chromic acid may be used in 2–3 times of the equimolar amount and that the reaction may be carried out at room temperature. A 3-γ-piperidinopropylindole derivative is dissolved or suspended in the solvent and the oxidizing agent is added to the solution or suspension with stirring. Generally, the reaction terminates within about 24 hours.

Where the oxidation is carried out by use of ozone, the reaction is preferably carried out at room temperature. A 3-γ-piperidinopropylindole derivative is dissolved or suspended in a solvent such as formic acid, acetic acid, carbon tetrachloride or the like and ozonized oxygen is bubbled into the solution or suspension with stirring.

The desired γ-piperidinobutyrophenone derivative can be separated from the reaction mixture in a crude form by extraction, with or without prior neutralization, and by evaporation to dryness. The product is further purified, if desired, by recrystallization from a suitable solvent such as ethanol, isopropanol or the like in a standard manner.

The resulting compound of the Formula II can be hydrolyzed to give a corresponding deacylated compound of the Formula III. The hydrolysis is accomplished under an acidic or alkaline condition according to an ordinary hydrolysis procedure.

By the above-mentioned procedure, there are synthesized, for example, the following compounds or acid addition salts thereof:

γ-(4'-hydroxy-4'-benzylpiperidino)-2-acetaminobutyrophenone

γ-(4'-hydroxy-4'-benzylpiperidino)-2-acetamino-5-fluorobutyrophenone

γ-[4'-hydroxy-4'-(p-chlorobenzyl)piperidino]-2-acetamino-5-fluorobutyrophenone

γ-[4'-hydroxy-4'-(p-methylbenzyl)piperidino]-2-acetamino-5-fluorobutyrophenone

γ-[4'-hydroxy-4'-(p-methoxybenzyl)piperidino]-2-acetamino-5-fluorobutyrophenone

γ-[4'-hydroxy-4'-(m-trifluoromethylbenzyl)piperidino]-2-acetamino-5-fluorobutyrophenone γ-[4'-hydroxy-4'-(β-phenethyl)piperidino]-2-acet-
   amino-5-fluorobutyrophenone
γ-[4'-hydroxy-4'-(p-chlorobenzyl)piperidino]-2-(N-
   methylacetamino)-5-fluorobutyrophenone
γ-[4'-(2''-oxo-1'''-benzimidazolinyl)piperidino]-2-acet-
   amino-5-fluorobutyrophenone
γ-[4'-(p-chlorobenzyl)piperidino]-2-acetamino-5-
   fluorobutyrophenone
γ-[4'-hydroxy-4'-(p-chlorobenzyl)piperidino]-2-acet-
   amino-4-fluorobutyrophenone
γ-[4'-hydroxy-4'-(p-chlorobenzyl)piperidino]-2-acet-
   amino-5-chlorobutyrophenone
γ-(4'-hydroxy-4'-benzylpiperidino)-2-aminobtuyro-
   phenone
γ-(4'-hydroxy-4'-benzylpiperidino)-2-amino-5-fluoro-
   butyrophenone
γ-[4'-hydroxy-4'-(p-chlorobenzyl)piperidino]-2-amino-
   5-fluorobutyrophenone
γ-[4'-hydroxy-4'-(p-methylbenzyl)piperidino]-2-amino-
   5-fluorobutyrophenone
γ-[4'-hydroxy-4'-(p-methoxybenzyl)piperidino]-2-
   amino-5-fluorobutyrophenone
γ-[4'-hydroxy-4'-(m-trifluoromethylbenzyl)piperidino]-
   2-amino-5-fluorobutyrophenone
γ-[4'-hydroxy-4'-(β-phenethyl)piperidino]-2-amino-5-
   fluorobutyrophenone
γ-[4'-hydroxy-4'-(p-chlorobenzyl)piperidino]-2-
   methylamino-5-fluorobutyrophenone
γ-[4'-(2''-oxo-1'''-benzimidazolinyl)piperidino]-2-
   amino-5-fluorobutyrophenone
γ-[4'-(p-chlorobenzyl)piperidino]-2-amino-5-fluoro-
   butyrophenone
γ-[4'-hydroxy-4'-(p-chlorobenzyl)piperidino]-2-amino-
   4-fluorobutyrophenone
γ-[4'-hydroxy-4'-(p-chlorobenzyl)piperidino]-2-amino-
   5-chlorobutyrophenone γ-Piperidinobutyrophenones of the Formula IV are prepared by diazotization of the above-obtained o-amino-compound of the Formula III wherein $R^5$ is hydrogen or an acid addition salt thereof and subsequent treatment of the resulting diazonium salt with a suitable agent to replace the diazonium group by hydrogen or halogen.

The diazotization is performed by a conventional method and the replacement reaction is conducted as follows:

By treating the diazonium salt with copper powder, fluoroboric acid or a metal salt such as cuprous chloride, cuprous bromide, potassium iodide, mercuric halide and the like, there can be obtained γ-piperidinobutyrophenones of the Formula IV wherein X is halogen.

By treating the diazonium salt with a reducing agent such as ethanol, hypophosphorus acid, alkaline formaldehyde, sodium stannite and the like, there can be obtained γ-piperidinobutyrophenones of the Formula IV wherein X is hydrogen.

The following reaction schemes are given in order to exemplify the replacement reaction of the invention.

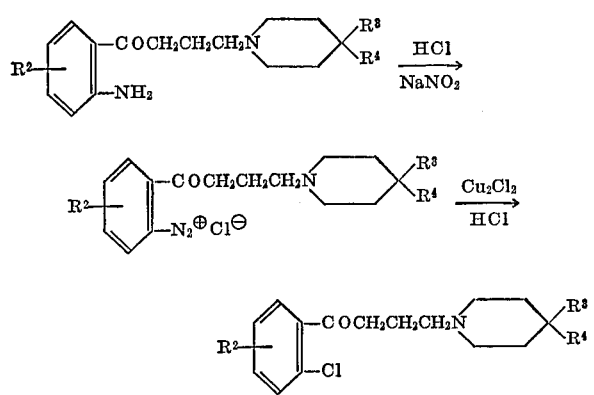

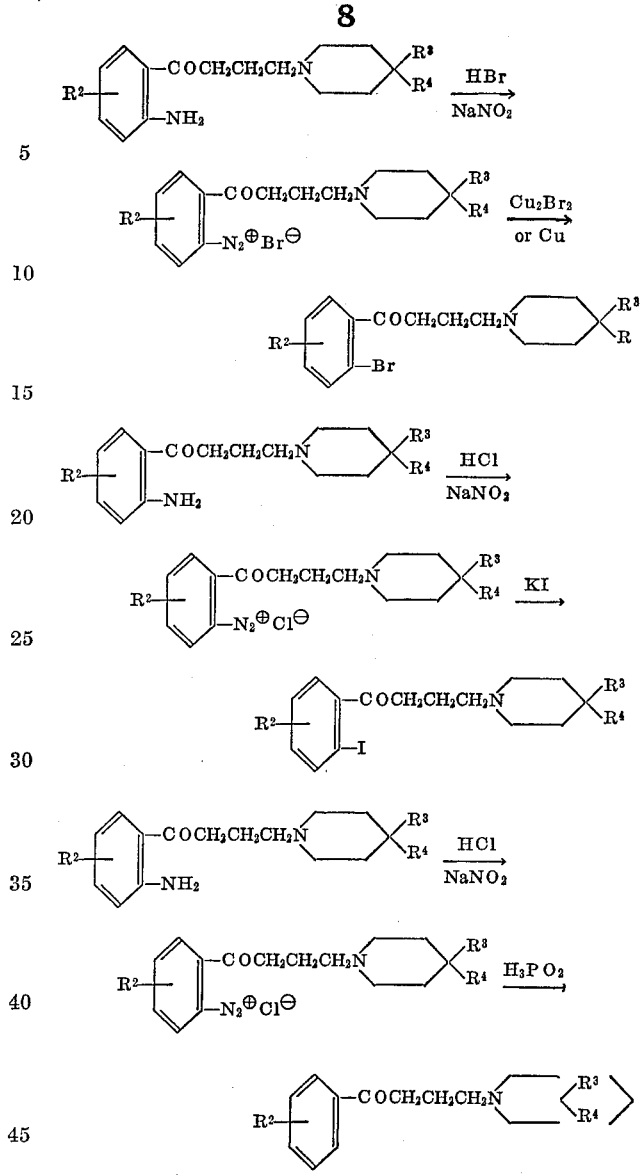

(In the above formulae, $R^2$, $R^3$ and $R^4$ are the same as described above.)

By the procedure mentioned above, there are synthesized, for example, the following compounds or acid addition salts thereof:

γ-(4'-hydroxy-4'-benzylpiperidino)butyrophenone
γ-(4'-hydroxy-4'-benzylpiperidino)-3-fluorobutyrophe-
   none
γ-[4'-hydroxy-4'-(p-chlorobenzyl)piperidino]-3-fluoro-
   butyrophenone
γ-[4'-hydroxy-4'-(p-methylbenzyl)piperidino]-3-fluoro-
   butyrophenone
γ-[4'-hydroxy-4'-(p-methoxybenzyl)piperidino]-3-fluoro-
   butyrophenone
γ-[4'-hydroxy-4'-(m-trifluoromethylbenzyl)piperidino]-
   3-fluorobutyrophenone
γ-[4'-hydroxy-4'-(β-phenethyl)piperidino]-3-fluoro-
   butyrophenone
γ-[4'-hydroxy-4'-(p-chlorobenzyl)piperidino]-3-fluoro-
   butyrophenone
γ-[4'-(2''-oxo-1'''-benzimidazolinyl)piperidino]-3-fluoro-
   butyrophenone
γ-[4'-(p-chlorobenzyl)piperidino]-3-fluorobutyro-
   phenone
γ-[4'-hydroxy-4'-(p-chlorobenzyl)piperidino]-4-fluoro-
   butyrophenone
γ-[4'-hydroxy-4'-(p-chlorobenzyl)piperidino]-3-chloro-
   butyrophenone γ-(4'-hydroxy-4'-benzylpiperidino)-2-chlorobutyrophenone γ-(4'-hydroxy-4'-benzylpiperidino)-2-chloro-5-fluorobutyrophenone γ-[4'-hydroxy-4'-(p-chlorobenzyl)piperidino]-2-chloro-5-fluorobutyrophenone γ-[4'-hydroxy-4'-(p-methylbenzyl)piperidino]-2-chloro-5-fluorobutyrophenone γ-[4'-hydroxy-4'-(p-methoxybenzyl)piperidino]-2-chloro-5-fluorobutyrophenone γ-[4'-hydroxy-4'-(m-trifluoromethylbenzyl)piperidino]-2-chloro-5-fluorobutyrophenone γ-[4'-hydroxy-4'-(β-phenethyl)piperidino]-2-chloro-5-fluorobutyrophenone γ-[4'-hydroxy-4'-(p-chlorobenzyl)piperidino]-2-bromo-5-fluorobutyrophenone γ-[4'-(2''-oxo-1''-benzimidazolinyl)piperdino]-2-chloro-5-fluorobutyrophenone γ-[4'-(p-chlorobenzyl)piperidino]-2-chloro-5-fluorobutyrophenone γ-[4'-hydroxy-4'-(p-chlorobenzyl)piperidino]-2-chloro-4-fluorobutyrophenone γ-[4'-hydroxy-4'-(p-chlorobenzyl)piperidino]-2,5-dichlorobutyrophenone γ-[4'-hydroxy-4'-(β-phenethyl)piperidino]-2,5-difloro-butyrophenone γ-[4'-hydroxy-4'-(p-chlorobenzyl)piperidino]-2-fluorobutyrophenone γ-[4'-(2''-oxo-1''-benzimidazolinyl)piperidino]-2-fluorobutyrophenone γ-[4'-(p-chlorobenzyl)piperidino]-2-fluorobutyrophenone γ-[4'-hydroxy-4'-(p-chlorobenzyl)piperidino]-2-bromobutyrophenone The present invention also provides novel central nervous system active γ-piperidinobutyrophenones of the Formula I in which $R^1$ is halogen, amino, acylamine, alkylamino or N-alkylacylamino, and pharmaceutically acceptable acid addition salts thereof.

The said salts are prepared by a usual manner and include those prepared from organic or inorganic acids such as hydrochloric, hydrobromic, sulfuric, nitric, phosphoric, acetic, citric, tartaric, lactic benzoic, cinnamic, methanesulfonic, p-toluenesulfonic, mandelic and the like.

The present inventors prepared a number of γ-piperidinobutyrophenone derivatives and evaluated the pharmacological effects thereof and found that the said novel compounds, i.e. derivatives having a substituent selected from the group consisting of halogen, amino or substituted amino at ortho-position of the benzoyl radical, have potent psychotropic activity.

The pharmacological evaluation has demonstrated that they posses a variety of depressant activities on the central nervous system. Some of the present compounds are more effective on a conditioned avoidance response in rats than chlorpromazine. They also possess anti-apomorphine and antimethamphetamine activities greater than those of chlorpromazine.

While the compounds of the present invention have many beneficial activities, they scarcely show any toxic symptoms, and it may safely be said that these compounds are of great value in practical use. Each of the pharmaceutically active compounds of the invention may be incorporated, e.g. in a tablet as the sole active ingredient for oral administration and may be quite useful as antianxiety, antipsychotonic, antiemotional, anticonvulsive, antipsychosis or analgesic drugs. A typical tablet is constituted by from 1 to 2 percent binder, e.g. tragacanth; from 3 to 10 percent lubricant, e.g. talcum; from 0.25–1.0 percent lubricant, e.g. magnesium stearate; an average dose of active ingredient; and q.s. 100 percent of filler, e.g. lactose. The usual oral dosage is 1–100 mg. per os daily.

The following examples are given to illustrate the process of the present invention more particularly.

EXAMPLE 1

Step 1

To a stirred solution of 5.0 g. of β-(2-methyl-3-indolyl) propionic acid and 2.5 g. of triethylamine in 100 ml. of chloroform was added dropwise 2.7 g. of ethyl chloroformate at a temperature below 0° C. After the addition was complete, stirring was continued for additional 15 minutes and thereto was added 4.7 g. of 4-benzyl-4-hydroxypiperidine in several portions. The reaction mixture was stirred for 4 hours at room temperature and allowed to stand overnight. The reaction product was washed thoroughly with water and concentrated to dryness. The residue was recrystallized from ethanol to give 1'-[β-(2-methyl-3-indolyl)propionyl]-4' - benzyl-4'-hydroxypiperidine, melting at 117°–119° C.

Step 2

To a stirred mixture of 2.0 g. of lithium aluminum hydride and 50 ml. of ether was added dropwise a solution of 4.6 g. 1'-[β-(2-methyl-3-indolyl)propionyl]-4'-benzyl-4'-hydroxypiperidine in 80 ml. of tetrahydrofuran over a period of 30 minutes under gentle refluxing.

Stirring and refluxing were continued for additional 4 hours and the reaction mixture was treated gradually with 10 ml. of cold water under cooling with ice. The resulting precipitate was filtered off and the filtrate was concentrated to dryness. Recrystallization of the residue from benzene gave 2-methyl-3-[γ-(4'-benzyl-4'-hydroxypiperidino)propyl]indole, melting at 132°–134° C.

Step 3

Into a solution of 3.0 g. of 2-methyl-3-[β-(4'-benzyl-4'-hydroxypiperidino)propyl]indole in 50 ml. of acetic acid was introduced a stream of oxygen containing about 3% of ozone over a period of 30 minutes during which time the temperature was maintained at 15°–20° C. The resulting solution was diluted with 200 ml. of water and made alkaline by slow addition of aqueous sodium hydroxide. The oily matter which was separated was extracted with chloroform and the extract was washed with water, dried and concentrated to give γ-(4'-benzyl-4'-hydroxypiperidino)-2-acetaminobutyrophenone as a viscous liquid. I.R. $\mu_{max}$: 3430, 3250, 1680, 1650, 1520, 1300 (cm.$^{-1}$).

The product obtained above was dissolved in 50 ml. of ethanol and the resulting solution was heated under reflux with 6 ml. of concentrated hydrochloric acid for 2 hours. After cooling, the mixture was diluted with 100 ml. of water, made alkaline by slow addition of aqueous sodium hydroxide and extracted with ethyl acetate. The extract was washed with water and concentrated to dryness. Recrystallization of the residue from ethanol gave γ-(4'-benzyl-4' - hydroxypiperidino) - 2-aminobutyrophenone, melting at 123°–124° C.

Step 4

To a cooled solution of 3.6 g. of γ-(4'-benzyl-4'-hydroxypiperidino)-2-aminobutyrophenone in 35 ml. of 2 N hydrochloric acid was added dropwise a solution of 0.74 g. of sodium nitrite in 5 ml. of water under stirring below 0° C. The resulting diazonium salt solution was added all at once to a cold suspension of 1.5 g. of cuprous chloride in 5 ml. of concentrated hydrochloric acid under vigorous stirring. The mixture was stirred for 30 minutes under cooling with ice, and stirring was continued for 2 hours at room temperature and then for 1 hour at 55°–60° C. After cooling, the reaction mixture was made alkaline, and extracted with chloroform. The extract was washed with water, dried and concentrated to a residue. The residue was treated with methanolic hydrogen chloride and recrystallization of the resulting solid matter from isopropanol gave γ-(4'-benzyl-4'-hydroxypiperidino)-2-chlorobutyrophenone hydrochloride.

By a method similar to that of Example 1, the following compounds were obtained:

γ-[4'-(2''-oxo-1''-benzimidazolinyl)piperidino]-
2-acetamino-4-fluorobutyrophenone γ-[4'-(2''-oxo-1''-benzimidazolinyl)piperidino]-
2-amino-4-fluorobutyrophenone γ-[4'-(2''-oxo-1''-benzimidazolinyl)piperidino]-
2-chloro-4-fluorobutyrophenone γ-(4'-benzyl-4'-hydroxypiperidino)-2-acetamino-
4-fluorobutyrophenone γ-(4'-benzyl-4'-hydroxypiperidino)-2-amino-
4-fluorobutyrophenone γ-(4'-benzyl-4'-hydroxypiperidino)-2-chloro-
4-fluorobutyrophenone γ-[4'-(p-chlorobenzyl)-4'-hydroxpiperidino]-
2-chloro-4-fluorobutyrophenone.

EXAMPLE 2

Step 1

To a solution of 2.0 g. of 2-methyl-3-[γ-(4'-p-chlorobenzyl-4'-hydroxypiperidino)propyl]-6-fluoroindole (prepared according to a procedure similar to that of steps 1 and 2 of Example 1) in 20 ml. of acetic acid was added dropwise a solution of 1.7 g. of chromic anhydride in 3 ml. of water under stirring below 15° C. The mixture was stirred at room temperature overnight and poured into 120 ml. of water. Thereto was added an aqueous solution of sodium hydroxide to make alkaline and the precipitated solid was collected by suction filtration on a Büchner funnel and washed with three 40 ml. portions of warm chloroform. The combined washings were washed with water and concentrated to dryness. The residual solid was recrystallized from aqueous acetone to give γ-[4'-(p-chlorobenzyl)-4'-hydroxypiperidino]-2-acetamino-4-fluorobutyrophenone. This was hydrolyzed under a condition similar to that of step 3 of Example 1 to γ-[4'-(p-chlorobenzyl)-4'-hydroxypiperidino]-2-amino-4-fluorobutyrophenone.

Step 2

To a solution of 3.5 g. of γ-[4'-(p-chlorobenzyl)-4'-hydroxypiperidino]-2-amino - 4 - fluorobutyrophenone in 100 ml. of 1 N hydrochloric acid was added dropwise a solution of 0.7 g. of sodium nitrite in 5 ml. of water under stirring below 0° C. The resulting diazonium salt solution was added to 40 ml. of cold 50% aqueous hypophosphorous acid under vigorous stirring. Stirring was continued for 2 hours under ice-cooling and the resulting mixture was stored in a refrigerator overnight. The cold reaction mixture was made alkaline by addition of aqueous sodium hydroxide and extracted with chloroform. The extract was washed with water and concentrated to dryness. Recrystallization of the residual crystalline solid from aqueous acetone gave γ-[4'-(p-chlorobenzyl)-4'-hydroxypiperidino]-4-fluorobutyrophenone.

By a method similar to that of Example 2, the following compounds were obtained:

γ-[4'-(2''-oxo-1''-benzimidazolinyl)piperidino]-
2-acetamino-5-fluorobutyrophenone γ-[4'-(2''-oxo-1''-benzimidazolinyl)piperidino]-
2-amino-5-fluorobutyrophenone γ-[4'-(2''-oxo-1''-benzimidazolinyl)piperidino]-
3-fluorobutyrophenone γ-[4'-hydroxy-4'-(p-methylbenzyl)piperidino]-
4-fluorobutyrophenone γ-[4'-hydroxy-4'-(p-methoxybenzyl)piperidino]-
4-fluorobutyrophenone γ-[4'-hydroxy-4'-(m-trifluoromethylbenzyl)piperidino]-
4-fluorobutyrophenone γ-[4'-hydroxy-4'-(β-phenethyl)piperidino]-
4-fluorobutyrophenone.

What is claimed is:
1. A process for producing a γ-piperidinobutyrophenone compound of the formula,

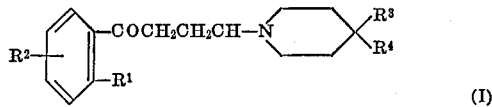

(I)

wherein
R¹ is hydrogen, halogen, amino, acylamino, N-acyl-(C₁-C₄ alkyl)amino or C₁-C₄ alkylamino;
R² is hydrogen or halogen;
R³ is hydrogen or hydroxyl; and
R⁴ is a group having the formula,

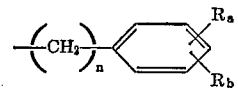

(wherein each of $R_a$ and $R_b$ is hydrogen, halogen, C₁-C₄ alkyl, C₁-C₄ alkoxy or trifluoromethyl; and n is 1 or 2) or a group having the formula,

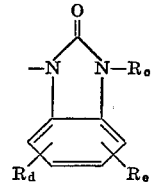

(wherein $R_c$ is hydrogen or C₁-C₄ alkyl; and each of $R_d$ and $R_e$ is hydrogen, halogen, C₁-C₄ alkyl or C₁-C₄ alkoxy), or a pharmaceutically acceptable acid addition salt thereof, which comprises contacting an indole compound of the formula,

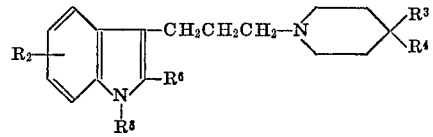

wherein each of R⁵ and R⁶ is hydrogen or C₁-C₄ alkyl; and R², R³ and R⁴ are the same as identified above, with an oxidizing agent to yield a compound of the formula,

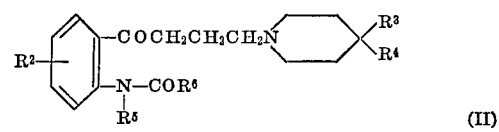

(II)

wherein R², R³, R⁴, R⁵ and R⁶ are the same as identified above, and if desired, hydrolyzing the resulting compound to a compound of the formula,

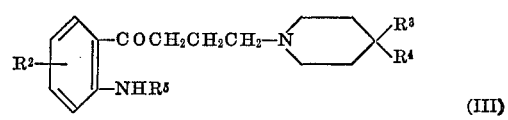

(III)

wherein R², R³, R⁴ and R⁵ are the same as defined above, or a pharmaceutically acceptable acid addition salt thereof, and further diazotizing, if desired, in case R⁵ is hydrogen, the resulting compound and subsequently decomposing the resulting diazonium compound to replace the diazonium group by hydrogen or halogen to yield a compound of the formula,

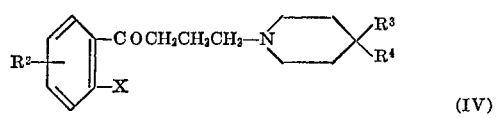

(IV)

wherein X is hydrogen or halogen; and R², R³ and R⁴ are the same as identified above, or a pharmaceutically acceptable acid addition salt thereof.

2. A process according to claim 1 wherein the said oxidizing agent is ozone, hydrogen peroxide, performic acid, peracetic acid, chromic acid or potassium permanganate.

3. A process for producing a γ-piperidinobutyrophenone compound of the formula,

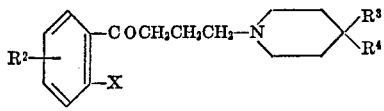

wherein $R^2$, $R^3$, $R^4$ and X are the same as set forth in claim 1, or a pharmaceutically acceptable acid addition salt thereof, which comprises contacting an indole compound of the formula,

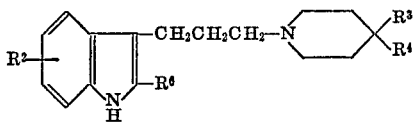

wherein $R^2$, $R^3$, $R^4$ and $R^6$ are the same as set forth in claim 1, or a pharmaceutically acceptable acid addition salt thereof, with an oxidizing agent and hydrolyzing the resultant product or a pharmaceutically acceptable acid addition salt thereof to yield a compound of the formula,

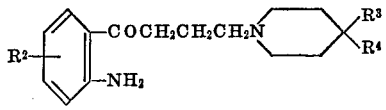

(III′)

wherein $R^2$, $R^3$, $R^4$ are the same as identified above, or a pharmaceutically acceptable acid addition salt thereof and diazotizing the resulting compound and subsequently decomposing the resulting diazonium salt to replace the diazonium group by hydrogen or halogen.

4. A process according to claim 3, wherein said oxidizing agent is ozone, hydrogen peroxide, performic acid, peracetic acid, chromic acid or potassium permanganate.

5. A process according to claim 3, including the additional step for preparing the indole compound, or a pharmaceutically an acid addition salt thereof, by contacting a compound of the formula,

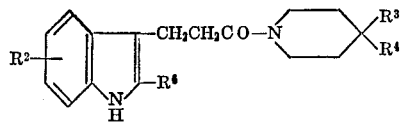

wherein $R^2$, $R^3$, $R^4$ are the same as set forth in claim 1 with a reducing agent.

6. A process according to claim 5, wherein the said reducing agent is a metal hydride complex.

References Cited
UNITED STATES PATENTS

| | | | |
|---|---|---|---|
| 3,161,645 | 12/1964 | Janssen | 260—293.4 |
| 3,438,991 | 4/1969 | Janssen | 260—294.7 |
| 3,462,444 | 8/1969 | Beckett et al. | 260—294.7 |

OTHER REFERENCES

Shirley, "Organic Chemistry," Holt, Rinehart and Winston, New York (1964), pp. 702–10.

HENRY R. JILES, Primary Examiner

G. THOMAS TODD, Assistant Examiner

U.S. Cl. X.R.

260—293.77, 293.79, 293.8; 424—267